Sept. 20, 1938.  C. W. COLLENS  2,130,949
CITRUS FRUIT KNIFE AND SEED EXTRACTOR
Filed Jan. 23, 1937
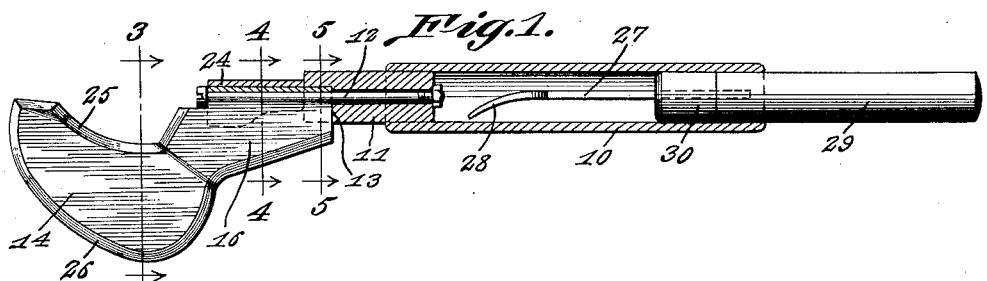
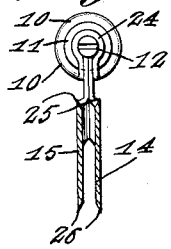 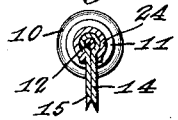 
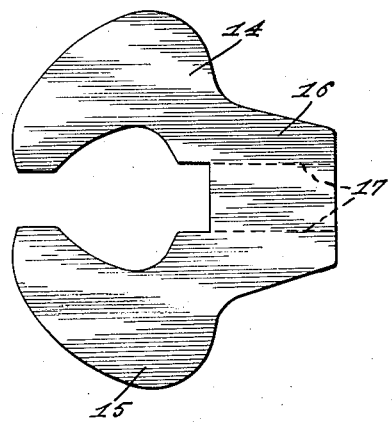 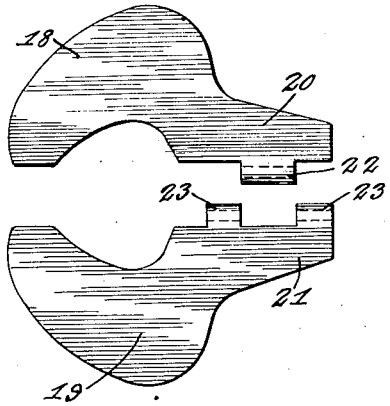
Campbell W. Collens,
INVENTOR
BY Victor J. Evans & Co.
ATTORNEYS Patented Sept. 20, 1938

2,130,949

UNITED STATES PATENT OFFICE 2,130,949

CITRUS FRUIT KNIFE AND SEED EXTRACTOR

Campbell Wharton Collens, New Orleans, La.

Application January 23, 1937, Serial No. 122,059

1 Claim. (Cl. 30—24)

This invention relates to a citrus fruit knife and seed extractor of the general type described in my prior patent for Citrus fruit knife and seed extractor, Number 2,051,680, dated August 18, 1936.

An object of the present invention is to provide a fruit knife of this type having a sectional handle which may be readily assembled and disassembled for cleansing of the parts when necessary, the handle being equipped with a blade adapted to straddle the partitions of citrus fruits and effectively separate the edible portion of the fruit from the core and fibrous divisions or partitions, allowing these latter to remain intact while the edible portions are lifted from between the partitions with a spoon.

A further object is to provide a citrus fruit knife of this character having a novel blade which may be formed from a single blank of metal or may be formed of separate blanks of metal having hinge eyes which may be clamped stationary to the anchor bolt of the blades by a novel clip, removal of which permits of the blades being rocked open to flat condition for easy cleansing.

A further object is to provide a citrus fruit knife having a handle or barrel in which the combined seed knife and finisher may be housed, the handle of the latter forming a continuation of the barrel and thus making available greater leverage when the knife is being used for separating the partitions from the edible portions of the fruit.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view of a combined citrus fruit knife and seed extractor constructed in accordance with the invention.

Figure 2 is a top plan view of the parts shown in Figure 1.

Figure 3 is a cross sectional view through the knife blades taken on the line 3—3 of Figure 1.

Figure 4 is a cross sectional view through the blades and securing clip taken on the line 4—4 of Figure 1.

Figure 5 is a cross sectional view through the barrel extension and rear ends of the blades taken on the line 5—5 of Figure 1.

Figure 6 is a plan view of a blank of material from which one piece blades may be formed.

Figure 7 is a plan view of a pair of blanks having hinge eyes for forming the blade in separable sections.

Figure 8 is a plan view of the seed extractor and finishing knife.

Figure 9 is a perspective view of the clip.

Referring now to the drawing in which like characters of reference designate similar parts in the various views, 10 designates a handle or barrel having a solid plug extension 11 closing one end, the extension having an axial opening 15 to receive an anchor bolt 12 which extends forwardly in prolongation of the axis of the barrel and forms means for attaching the knife blade to the barrel. The extension is provided with a radial slot 13 at one end to receive the rear ends of the blades so that the latter will be held against turning in the extension.

The blades 14 and 15, may be formed from a single blank of metal as best shown in Figure 6, the blank having a neck 16 which may be bent upon itself, as for instance along the dotted lines 17 to form substantially a cylinder for tightly embracing the anchor bolt 12. In the preferred form of the invention the blades 18 and 19 are formed in two pieces having respective necks 20 and 21, one of these necks being provided with a hinge eye 22 and the other being provided with spaced hinge eyes 23. The hinge eyes 22 and 23 are interleaved to assemble the blades on the anchor bolt 12. In either form of blade construction the rear ends of the blades are disposed parallel with each other to enter the slot 13 in the barrel extension 11 and be held by the walls of the slot against turning upon the anchor bolt.

To hold the blades 18 and 19 parallel with each other, a substantially U-shaped clip 24, formed of spring metal, is disposed to straddle the cylindrical portions of the blades that encircle the anchor bolt as best shown in Figures 3 and 4. Removal of the clip permits of the blades being rocked open to substantially flat condition, on the anchor bolt 12 as a pivot, to facilitate thorough cleansing of the blades.

The parallel blades 18 and 19 have curved longitudinal edges which are sharpened as shown at 25 and 26 to sever the cellular flesh of the citrus fruit from the fibrous partitions along the sides of the latter.

For severing the cellular flesh of the fruit from the rind a knife blade 27 is provided, the same having a curved extremity 28 conforming to the curvature of the rind. The blade is provided with a handle 29, equipped with a ferrule 30 to mount the blade securely in place. The blade is enlarged to substantially oval shape at the tip as shown at 31 and in the tip is provided with an opening 32 which is adapted to receive a citrus fruit seed for extracting the same from the edible portion of the fruit.

The handle and ferrule 29 and 30 are of sufficient diameter to snugly fit in the bore of the barrel 10 to permit the blade 27 to be housed and concealed in the bore of the barrel while the handle 29 projects beyond the barrel and forms an extension of the barrel to permit great leverage being applied to the blades when the knife is in use to sever the flesh from the partition of the fruit.

In operation the knife is inserted in a half of a citrus fruit with a downward movement from an initial position in which the tips of the blades 18 and 19 may be placed near the inner surface of the rind. The two blades straddle one of the fibrous partitions of the fruit and as the knife is driven downwardly the curved outer longitudinal edges 26 ride upon the inner surface of the rind and guide the blades forward toward the core of the fruit. The user may now force the handle radially to sever the partitions from the cellular flesh of the fruit. The finishing knife may now be brought into use, the curved tip 28 of the blade being placed against the rind and with a circular motion the blade may be carried around the rind to sever the flesh of the fruit from the rind. Seeds may be extracted subsequently by inserting the orificed tip of the finishing knife underneath the seed as will be understood.

From the above description it is thought that the construction and operation of the invention will be fully understood without further explanation.

What is claimed is:

A citrus fruit knife comprising a pair of blades, a barrel forming a handle and having an extension formed with a slot, a pivot connecting said blades together and to said extension with said slot to prevent movement of said blades relative to said handle, and a spring clip straddling said blades and coacting therewith to maintain said blades in operating position and detachable from said blades to permit a spreading of said blades for cleaning.

CAMPBELL W. COLLENS.